United States Patent [19]

Stendin et al.

[11] Patent Number: 5,388,451
[45] Date of Patent: Feb. 14, 1995

[54] HIGH VOLTAGE TRANSMISSION SWITCHING APPARATUS WITH GAS MONITORING DEVICE

[75] Inventors: Anders M. Stendin, Spokane; William J. Seaton, Greenacres; David A. Gwynne; Greg A. Lloyd, both of Spokane, all of Wash.

[73] Assignee: Consolidated Electronics Inc., Spokane, Wash.

[21] Appl. No.: 100,574

[22] Filed: Jul. 30, 1993

[51] Int. Cl.6 .............................................. G01D 21/02
[52] U.S. Cl. .................................... 73/438; 73/30.02; 374/143; 361/37; 200/148 R
[58] Field of Search ................... 73/30.02, 23.2, 438; 374/141, 142, 143; 361/36, 37, 103, 170; 307/118, 117; 340/635, 638, 644; 200/148 R, 148 D, 148 E

[56] References Cited

U.S. PATENT DOCUMENTS

| | | | |
|---|---|---|---|
| 2,136,900 | 11/1938 | Woolley | 177/351 |
| 3,196,271 | 7/1965 | Wright | 73/30.04 |
| 3,214,962 | 11/1965 | Prunty et al. | 73/31.04 |
| 3,311,454 | 3/1967 | Kemeny et al. | 73/31.04 |
| 3,355,949 | 12/1967 | Elwood et al. | 374/143 |
| 3,732,728 | 5/1973 | Fitzpatrick | 374/143 |
| 3,934,454 | 1/1976 | Simo | 374/143 |
| 4,027,125 | 5/1977 | Peek et al. | 200/148 R |
| 4,195,349 | 3/1980 | Balkanli | 374/143 |
| 4,262,532 | 4/1981 | Butler et al. | 73/345 |
| 4,366,714 | 1/1983 | Adorni | 73/708 |
| 4,394,635 | 7/1983 | Foss | 73/31.04 |
| 4,489,592 | 12/1984 | Pacanowski et al. | 73/31.04 |
| 4,562,723 | 1/1986 | Hubner | 73/31.02 |
| 4,577,510 | 3/1986 | Bur et al. | 73/708 |
| 4,752,141 | 6/1988 | Sun et al. | 374/145 |
| 4,802,370 | 2/1989 | EerNisse et al. | 374/143 |
| 4,870,863 | 10/1989 | Duncan et al. | 73/431 |
| 4,965,731 | 10/1990 | Weitz, Jr. | 364/442 |
| 5,040,415 | 8/1991 | Barkhoudarian | 73/198 |
| 5,070,732 | 12/1991 | Duncan et al. | 73/431 |
| 5,187,984 | 2/1993 | Mosser et al. | 73/708 |

Primary Examiner—Thomas P. Noland
Assistant Examiner—Helen C. Kwok
Attorney, Agent, or Firm—Wells, St. John, Roberts, Gregory & Matkin

[57] ABSTRACT

A high voltage switching apparatus 10 is described containing an arc-quenching gas containing sulphurhexafluoride in a vessel 12 that is monitored by a gas monitoring device 20. A temperature transducer 34 is attached to the exterior of the vessel 12 to sense the temperature of the gas. A gas line 24 leads from a control panel 18 to an enclosure 22 of the device 20. The device 20 has a front display panel with a digital communication terminal 42 for connecting to a computer to load and download data to and from the device 20 relating to the density of the gas within the vessel 12. The device 20 includes a data input module 44, a control module 46, a relay module 48, a display module 50 and a DC power supply module 52 mounted in an enclosure 22. The enclosure 22 has an internal heater 56 for maintaining the temperature within the enclosure above 20° C. The control module 46 has a microprocessor 70 that is program controlled to poll the transducers and calculate the present density of the gas and determine if the density has sufficient deviation to warrant the activation of a series of relays. Additionally, the microprocessor 70 is programmed to record the events that occur to the device as a historical record that may be later downloaded.

31 Claims, 10 Drawing Sheets

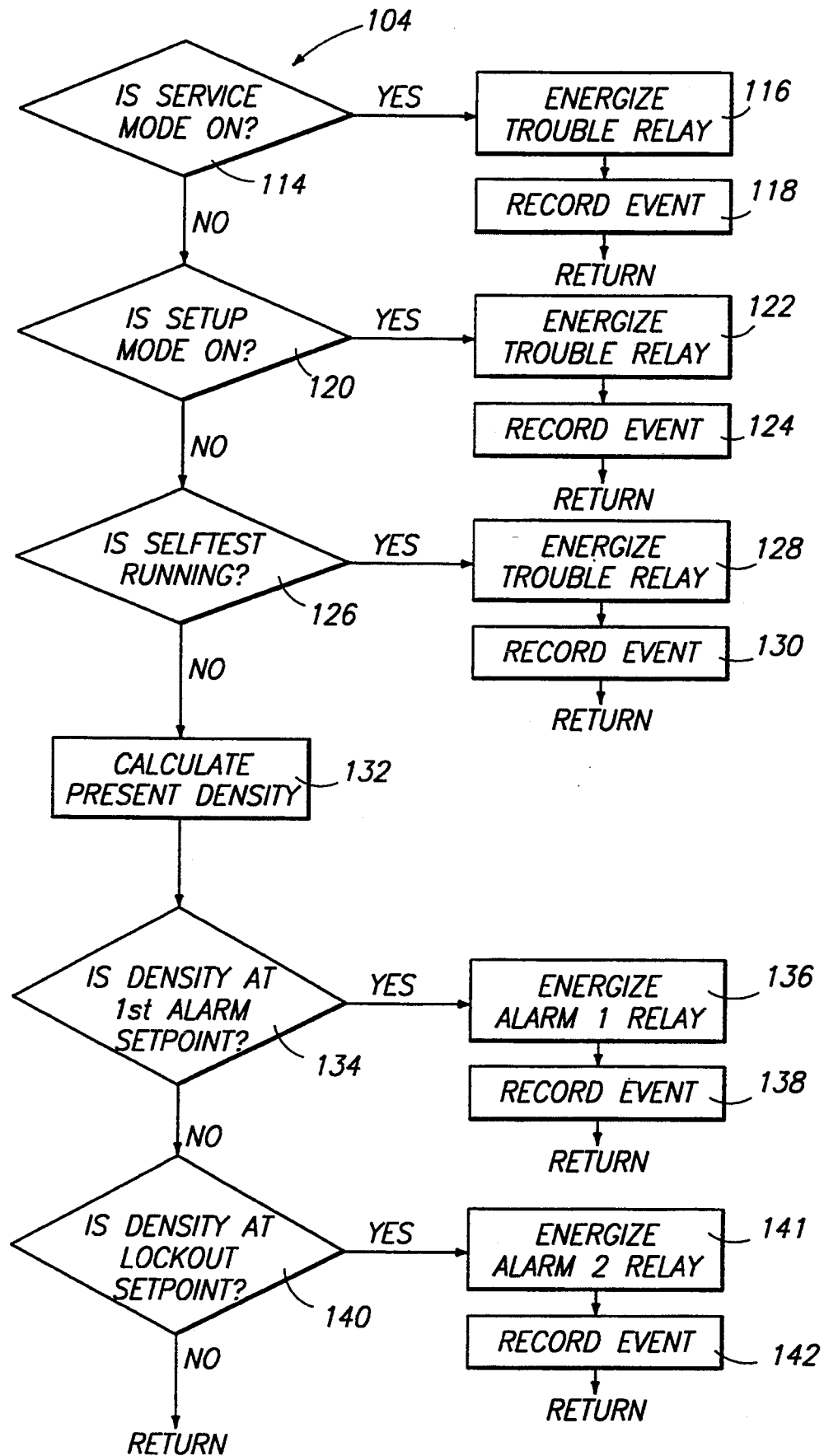

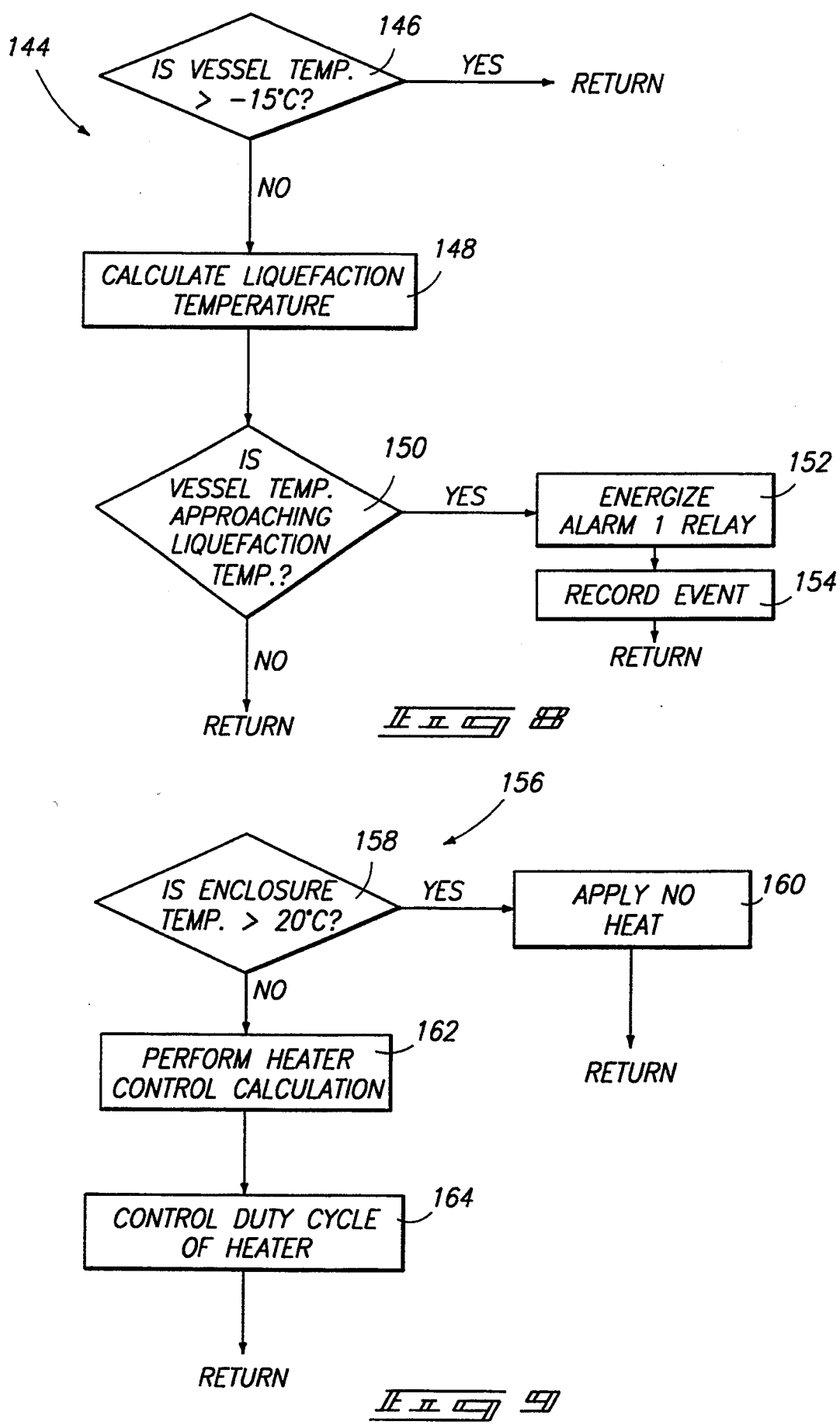

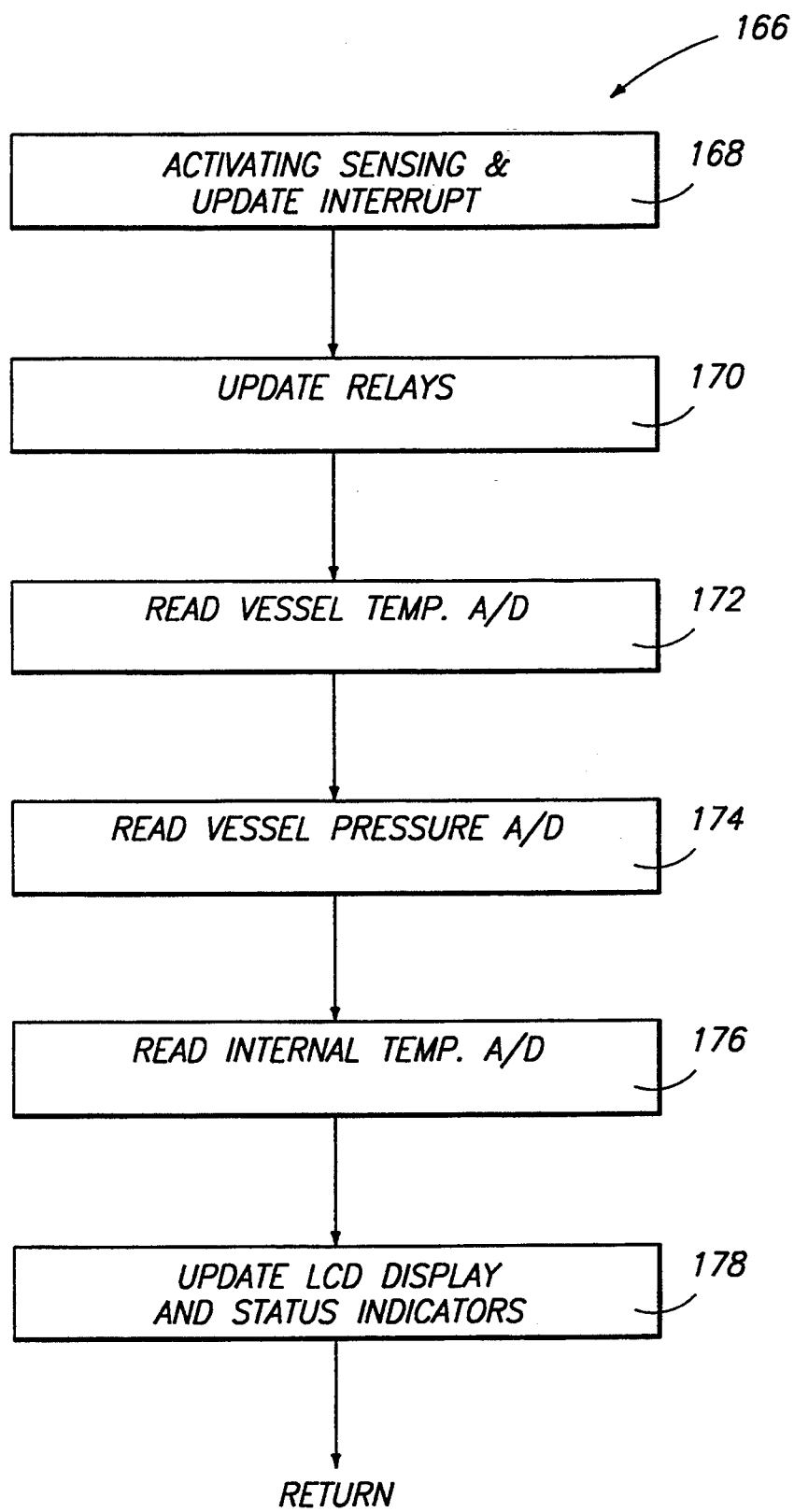

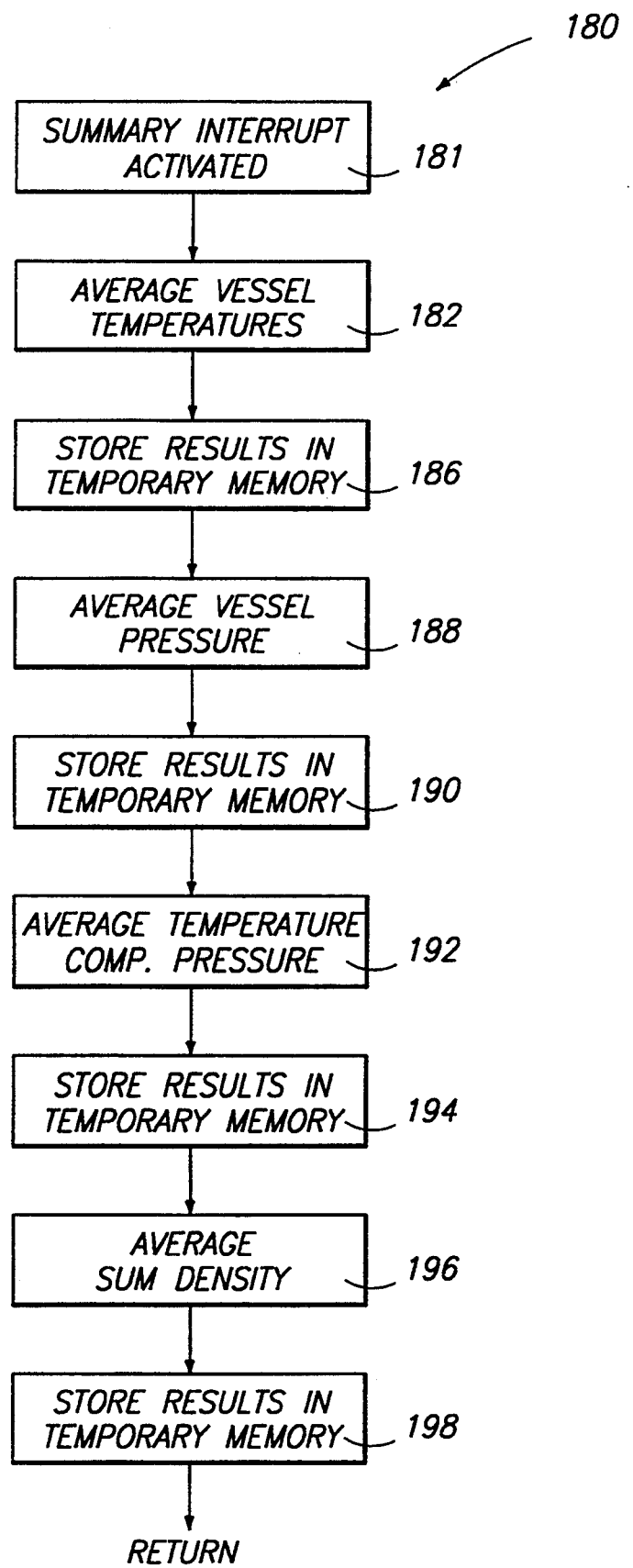

HIGH VOLTAGE TRANSMISSION SWITCHING APPARATUS WITH GAS MONITORING DEVICE

TECHNICAL

This invention is concerned with 69 KV–500 KV high voltage electrical switching apparatus having an arc-quenching gas containing sulphurhexafluoride for protecting the apparatus and a gas monitor for monitoring the quantity of sulphurhexafluoride within the apparatus to prolong the usable life and to minimize premature failure of the apparatus.

BACKGROUND OF THE INVENTION

Sulphurhexafluoride is widely used as an electrical arc-quenching gas in high voltage electrical switching apparatus in 69 KV–500 KV electrical distribution systems such as station and sub-station circuit breakers to prevent electrical arcing while the circuit breaker is being opened or closed. However to insure the elimination of electrical arcing, the breaker vessel must contain a sufficient quantity of sulphurhexafluoride. Should the amount or density of the sulphurhexafluoride within the breaker vessel be inadequate, then arcing may occur causing the breaker to fail.

The 69 KV–500 KV high voltage circuit breakers apparatuses have external breaker control cabinets with pressure monitors therein for monitoring the gas pressure within the circuit breaker vessels. Generally the monitor includes a pressure gauge with an analog display that displays the gauge gas pressure within the breaker vessel. Frequently the pressure monitor has two or more associated temperature compensated pressure switches that are set to generate warning signals to the station or sub-station operators when the pressure within the circuit breaker vessel falls below preset pressure values. An example of such a system is illustrated in U.S. Pat. No. 3,934,454, issued Jan. 27, 1976, to Stephen G. Simo.

Such pressure monitoring arrangements are based upon the assumption that the gas pressure, even when temperature compensated, is indicative of the quantity or density of the sulphurhexafluoride contained within the vessel. Such systems assume that sulphurhexafluoride gas, whether in diluted or undiluted form, is a "perfect gas" in which the pressure and quantity are linearly related. However, experimentation has shown that the relationship is not linear, particularly at high and low pressures. The problem is further compounded by the fact that sulphurhexafluoride has a rather high liquefaction temperature, requiring that the sulphurhexafluoride gas be diluted with a low liquefaction gas such as nitrogen. Such dilution further complicates the issue of whether the pressure gauge accurately displays the quantity of sulphurhexafluoride in the breaker vessel.

To overcome these and other problems, applicants' invention provides for a much improved high voltage distribution apparatus having a density monitor that more accurately determines the density and quantity of sulphurhexafluoride residing within the pressurized vessel.

These and other objects and advantages of this invention will become apparent upon reading the following detailed description of a preferred embodiment.

BRIEF DESCRIPTION OF THE DRAWINGS

The preferred embodiment of the invention is illustrated in the accompanying drawings, in which:

FIG. 7 is a block diagram illustrating the general steps of a gas density calculation procedure of the computer program;

FIG. 8 is a block diagram illustrating the general steps of a liquefaction temperature calculation procedure of the computer program;

FIG. 9 is a block diagram illustrating the general steps of an internal heater control procedure of the computer program;

FIG. 10 is a block diagram illustrating the general steps of sample and update relays and displays interrupt procedure of the computer program;

FIG. 11 is a block diagram illustrating the general steps of first data summary interrupt procedure of the computer program;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
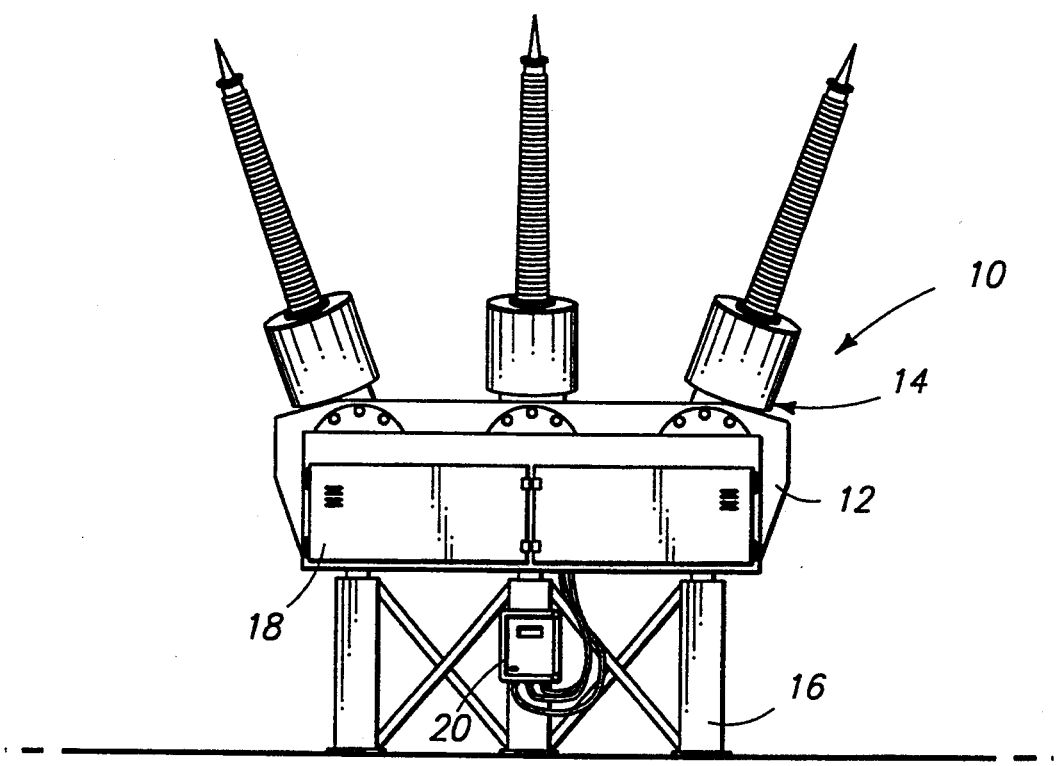
FIG. 1 is an isometric view of a high voltage transmission circuit breaker with a breaker control cabinet and an attached sulphurhexafluoride gas density monitor and events recorder device.

This invention is directed to high voltage distribution switching apparatus capable of distributing electrical energy between 69 KV and 500 KV. A preferred embodiment of this invention is illustrated in the drawing, in which FIG. 1 illustrates a high voltage circuit breaker apparatus generally designated with the numeral 10. The breaker apparatus 10 has a general housing with a normally pressurized vessel 12 containing a gas insulated high voltage circuit breaker 14. Most frequently the apparatus 10 is located at a high voltage electrical distribution sub-station that generates strong electromagnetic radiation.

The circuit breaker apparatus 10 has a support frame 16 supporting the vessel 12. A unit breaker control panel or cabinet 18 is mounted on the support frame 16 for directly controlling the circuit breaker 14.

The vessel 12 is filled with an arc-quenching insulating gas containing sulphurhexafluoride. In some applications, the sulphurhexafluoride gas may be mixed with an inert gas that has a low liquefaction temperature, such as nitrogen, to minimize liquefaction of the arc-quenching gas during the operation of the apparatus 10.

The apparatus includes a gas monitoring and events recording device, generally designated with the numeral 20, that is supported on the support frame 16 at a location that is conveniently accessible by sub-station personnel. The device 20 continuously monitors the temperature and pressure of the arc-quenching gas and calculates its density and stores such information for subsequent retrieval. Should the density of the arc-quenching gas fall below preset values, warning or alarm signals are generated and communicated to the breaker control panel 18, which in turn may communicate such alarms to the sub-station operation center. In addition, the device records the occurrence of an event such as the generation of an alarm signal, both as to the time of the occurrence and the type of event. Such operational features will be discussed in more detail, after many of the structure details of the device 10 are first explained.

Figure 2:
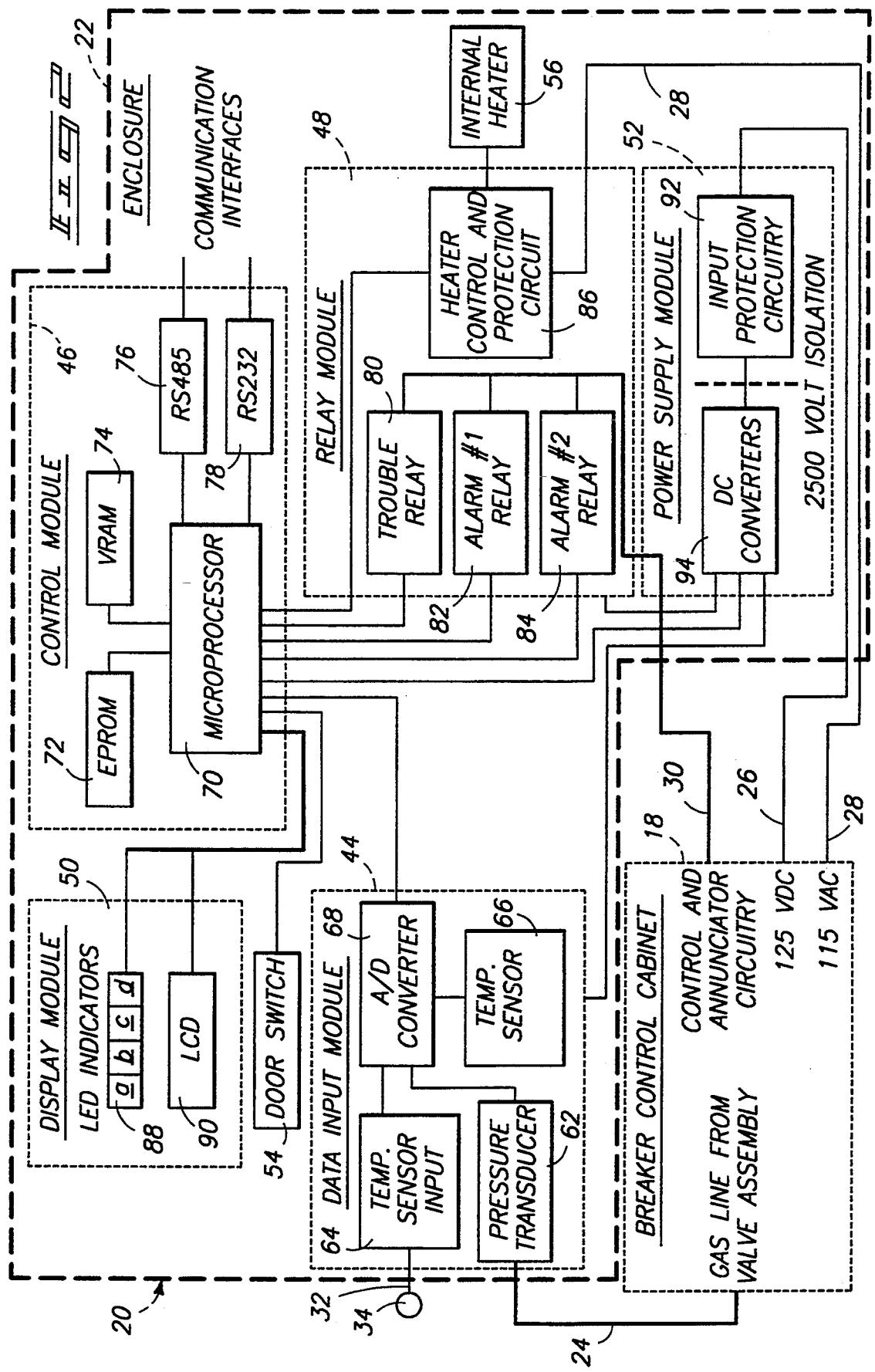
FIG. 2 is a diagrammatical block view of the sulphurhexafluoride gas density monitor and events recorder device and various modules thereof.

The device 20 has a moisture resistent enclosure 22, that has an enclosure environmental rating of NEMA Type 4X, 4, 12 and 13. The enclosure 22 has a rectangular box shape with a front wall or door 23a, a back wall 23b, side walls 23c, 23d, bottom wall 23e and top wall 23f. The bottom wall 23e preferably has fitting openings to receive a gas line 24, a DC power cable 26, a AC power cable 28, a relay output cable 30 and a temperature transducer cable 32 (FIG. 2). The gas line 24, DC power cable 26, the AC power cable 28 and the relay output cable 30 extend between the enclosure 22 and the unit breaker panel 18.

Figure 13:
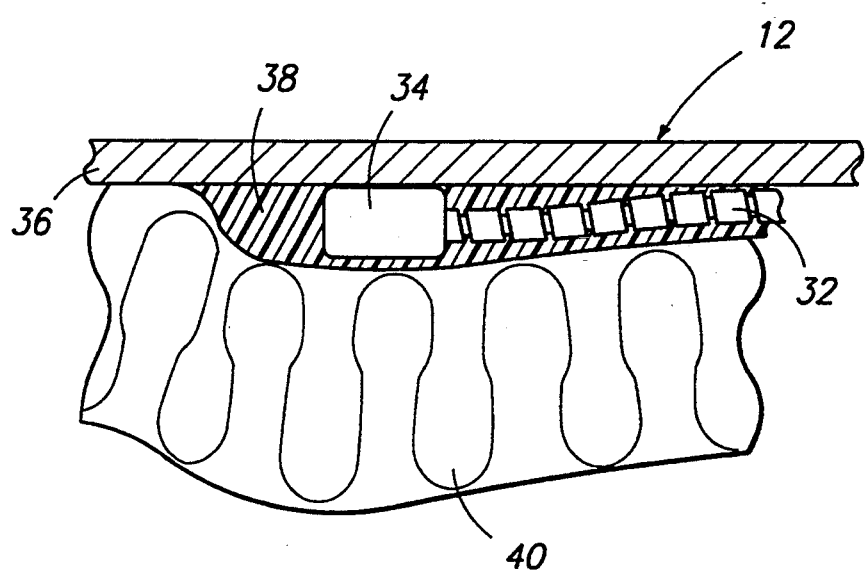
FIG. 13 is a fragmentary cross-sectional view of a section of a vessel of the apparatus showing a temperature sensor mounted on an exterior surface of a vessel wall.

The temperature transducer cable 32 extends from the enclosure 22 to an external temperature transducer 34 that senses the temperature of the arc-quenching gas. As illustrated in FIG. 13, the temperature transducer 34 is mounted on an exterior surface 36 of the vessel 12 to sense the temperature of the gas within the vessel 12. The transducer 34 is secured to the exterior surface 36 by heat transmitting epoxy adhesive 38. Both the adhesive 38 and the transducer 34 are covered by a thermal insulative blanket or covering 40 to minimize localized heating of the transducer by external environment conditions. For some installations, a temperature probe may be used to insert into the vessel 12 through an appropriate fitting.

Figure 3:
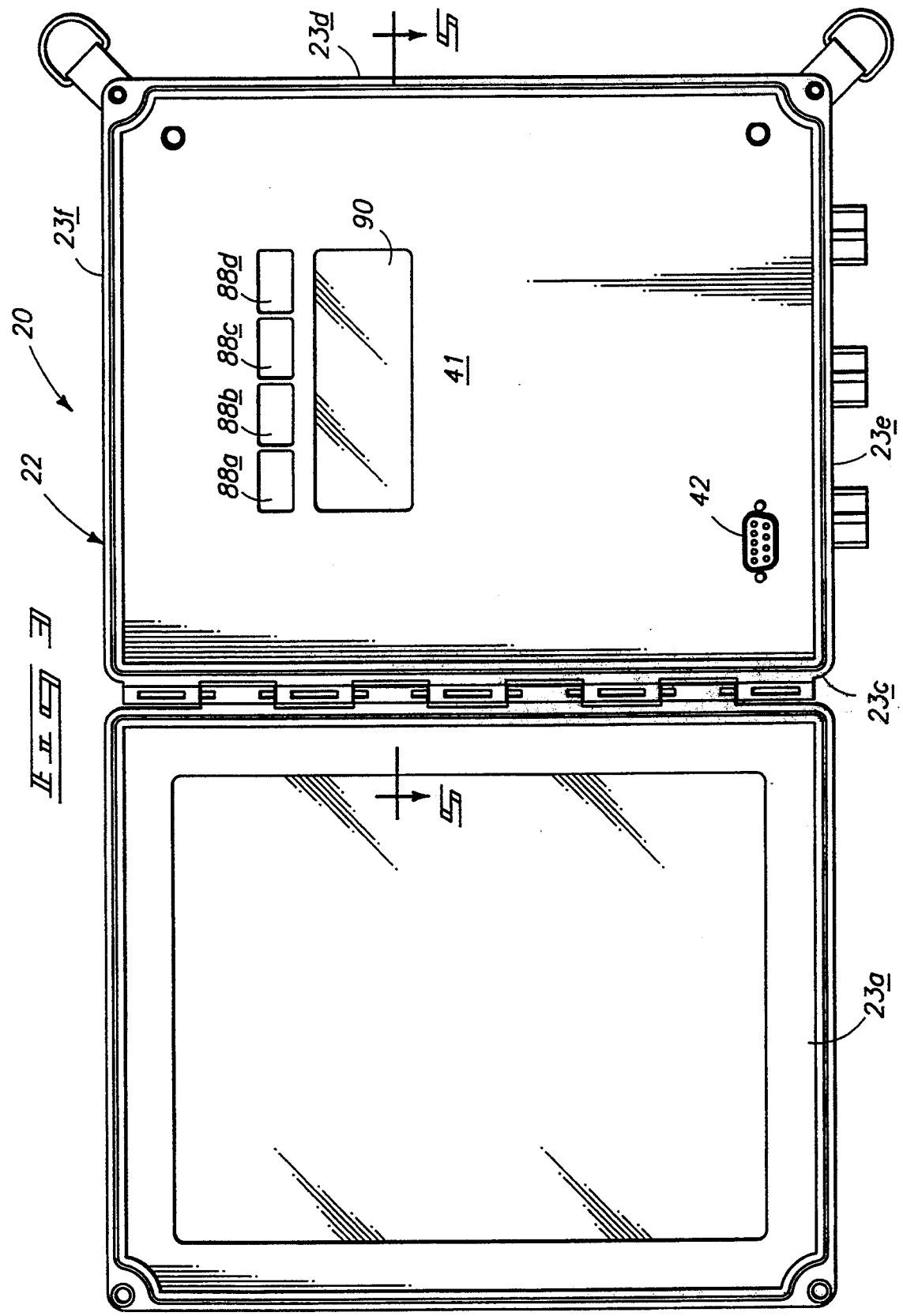
FIG. 3 is a front view of the gas density monitor and events recorder device with a front cover in an open position exposing a display panel.

As illustrated in FIG. 3, the front wall or door 23a has a transparent central panel and is hinged to side wall 23c to enable the front door to be swung open to provide access to a front display panel 41. A digital communication terminal port or receptacle 42 is mounted in the front display panel 41 to enable an intelligent computer device, such as a hand-held or notebook computer, to be selectively connected to the device 10 through the terminal port 42 to input information to "setup" the device and to "download" information from the device when desired, and on-line monitoring.

Importantly, the device 20 contains a computer programmed control means which is subdivided into several modules, which are individually protected with EMI shield covers 53 (FIG. 5) from the strong electromagnetic radiation generated from the circuit breaker 14 and other equipment at the sub-station.

Figure 4:
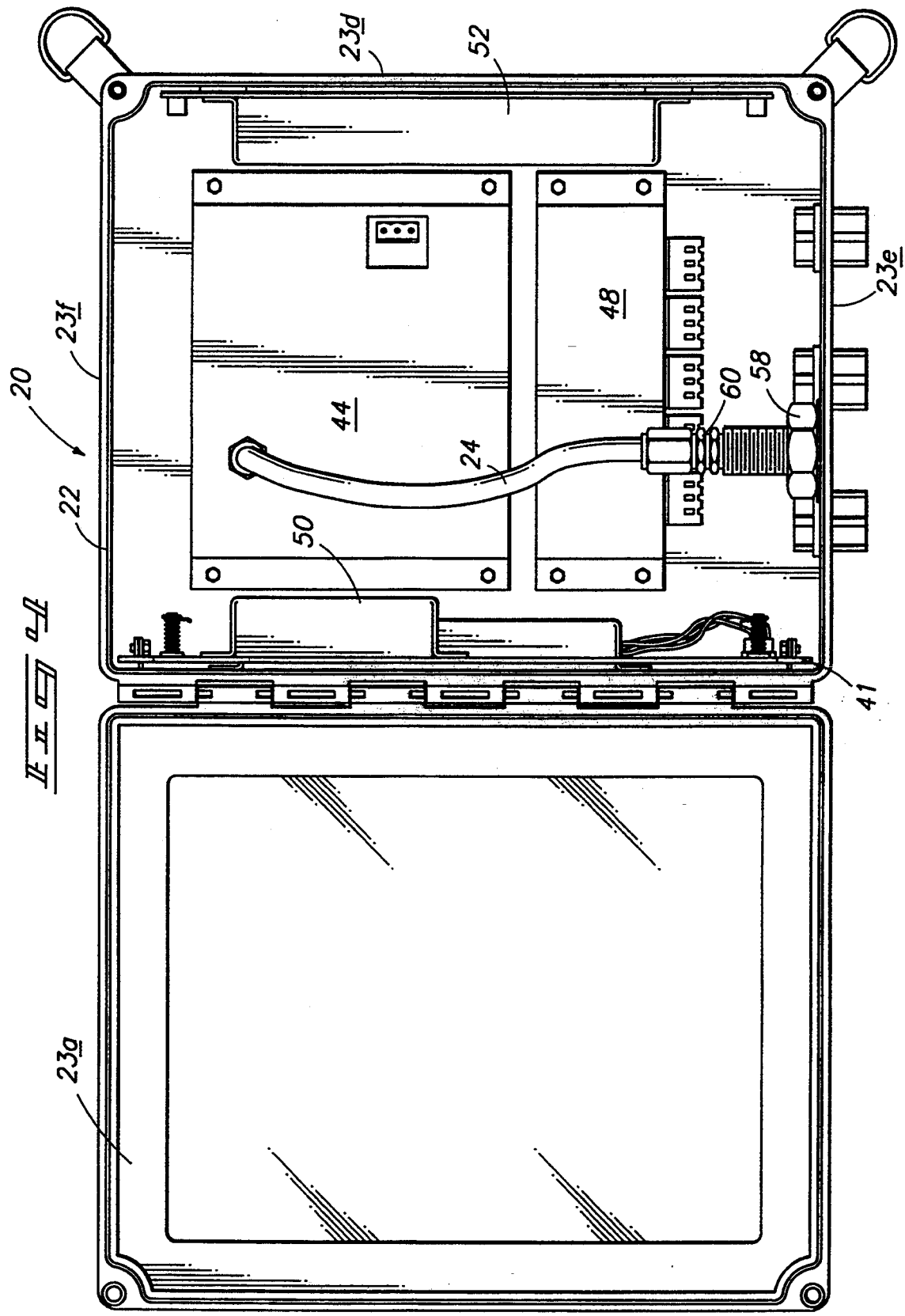
FIG. 4 is a front view of the device illustrated in FIG. 3, except showing the display panel pivoted to an open position exposing a number of modules within the interior of the device.
Figure 5:
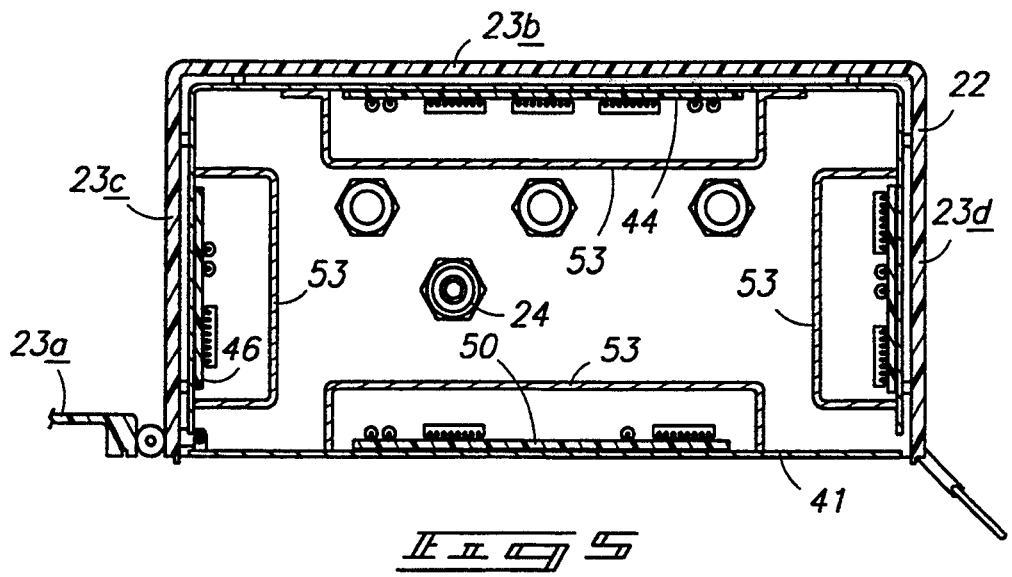
FIG. 5 is horizontal cross-sectional view taken along line 5—5 in FIG. 3 illustrating electromagnetic shields protecting the electronic modules.

In the preferred embodiment, the computer programmed control means is subdivided into a data input module 44, a control module 46, a relay module 48, a display module 50, and a power supply module 52 (FIGS. 2, 4 and 5).

The control means is operatively connected to a door switch 54 (FIG. 2) which indicates whether the door 23a is open or closed. When the door 23a is open, the control means indicates that an abnormal condition exists. Additionally, the control means is operatively connected to an internal heater that heats the interior of the enclosure 22 to maintain the interior temperature of the enclosure 22 at or above 20° C.

The gas line 24 extends from the control panel 18 through an enclosure fitting 58 and then through a one-way valve 60 (FIG. 4) terminating at a pressure transducer 62 in the data input module. The one-way valve 60 is intended to prevent gas leakage from the enclosure 22 should the valve 60 sense a sudden pressure drop across the valve 60.

The data input module 44 further contains a vessel temperature sensor input 64 connected to the temperature transducer 34 for sensing the analog value of the arc-quenching gas within the vessel 12. The module 44 also has an interior temperature sensor 66 for sensing the analog value of the temperature inside the enclosure 22. The outputs from the temperature sensor input 64, the pressure transducer 62 and the temperature sensor 66 are directed to an analog-to-digital converter 68 to convert the analog signals to digital signals for processing by the components of the control module 46.

The control module 46 includes a microprocessor 70, a program memory (EPROM) 72, a non-volatile mass memory (NVRAM) 74 for temporary and permanent data memory, and communication interfaces 76 and 78.

The relay module 48 includes a trouble relay 80, an alarm No. 1 relay 82, an alarm No. 2 relay 84, and a heater control and protection circuit 86 that are individually connected to output ports of the microprocessor 70. The heater control and protection circuit 86 is connected to the AC power cable 28 to regulate, under control of the microprocessor 70, the amount of energy supplied to the internal heater 56.

The display module 50 includes a cluster of LED status indicators 88, preferably a "normal" status indicator 88a, a "trouble" status indicator 88b, an "alarm No. 1" indicator 88c, and an "alarm No. 2" indicator 88d. The status indicators 88 are connected to output ports of the microprocessor 70. Additionally, the display module 50 has a multi-character LCD display matrix 90 for displaying alphanumeric information to the sub-station personnel. The indicators 88 and the alphanumeric display 90 are mounted on the front display panel 41 to be seen through the transparent window in the front door 23a.

The power supply module 52 includes input voltage and current protection circuitry 92 to protect the control means from voltage surges up to approximately 2500 volts. The output from circuitry 92 is directed to DC output voltage converters 94 that supply the necessary DC voltages for the control means.

The operation of the gas monitor and events recorder device 20 will be generally described in relation to the computer program procedural block flow diagrams depicted in FIGS. 6–12.

Figure 6:
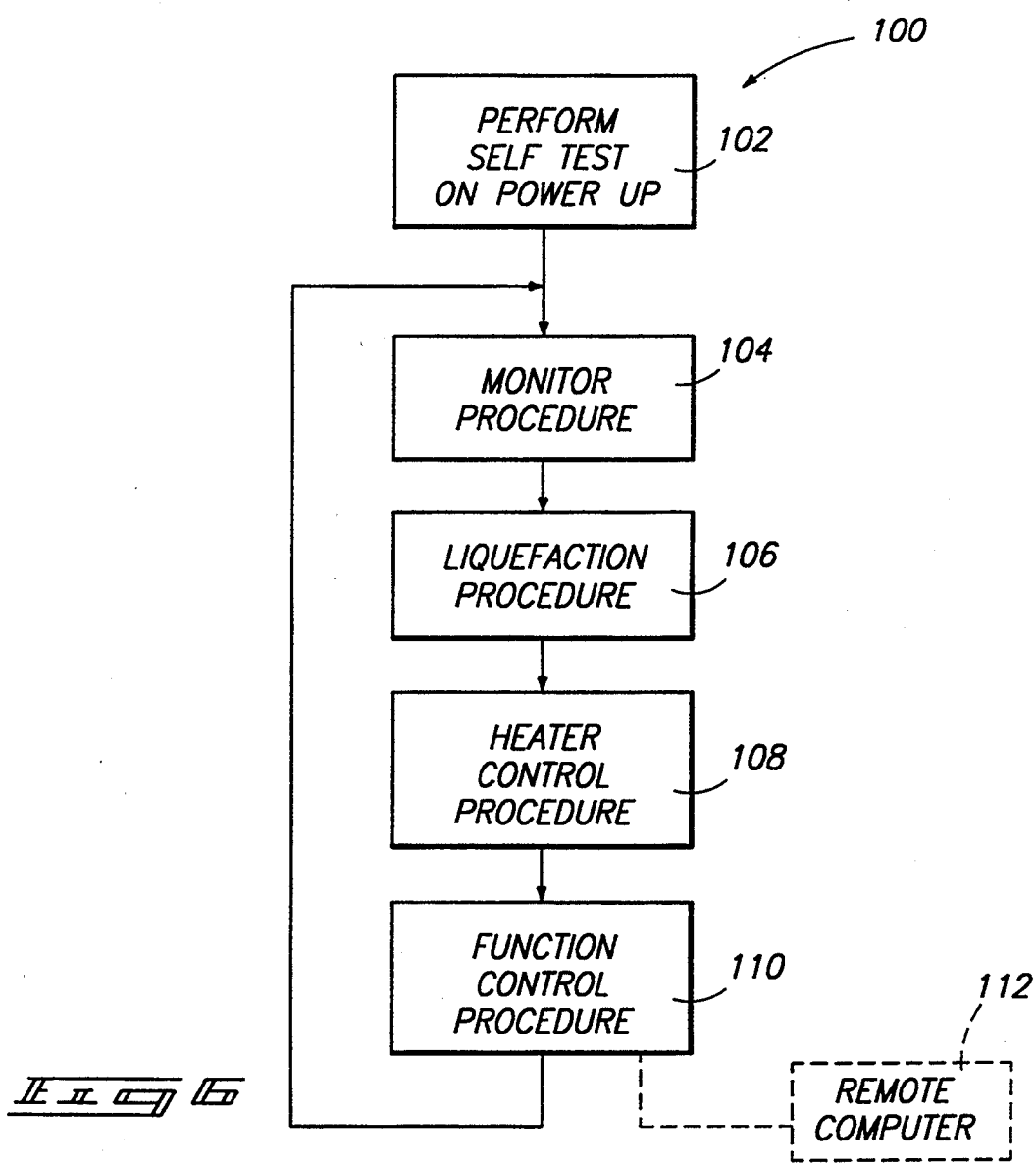
FIG. 6 is a block diagram illustrating the main procedure loop of a computer program for controlling the operation of the gas density monitor and events recorder device.

A generalized main computer program flow diagram 100 is illustrated in FIG. 6. Normally on "power up" an automatic self-test is performed at step 102. If the self-test detects a malfunction, then the trouble indicator 88b is activated. If the self-test is successful, then the program proceeds through the general monitor procedure 104 that illustrated in more detail in FIG. 7; the liquefaction procedure 106 that is illustrated in more detail in FIG. 8; the heater control procedure 108 that is illustrated in more detail in FIG. 9; and the function control procedure 110. The function control procedure is principally controlled by a remote computer 112 connected though the communication port 42 to execute sub-procedures according to a main menu illustrated in a remote computer Screen Display No. 1.

| SCREEN DISPLAY NO. 1 | | |
|---|---|---|
| SM-6 MAIN MENU | | Date |
| 1 Date/Time | 5 Database | 08/07/92 |
| 2 Units | 6 Network | Time |
| 3 Setup | 7 Test Mode | 16:15:22 |
| 4 Service | 8 Events | Int. Temp. |
| | | +20.0 |

The menu items may be selected by cursor control. The remote control computer operator enters or changes the time and date information under the "Date/Time" sub-procedure. The measurement units are entered under the "Units" sub-procedure. For example, the pressure units may be "Kgf/cm$^2$", "PSI" or "Bar"; the temperature units may be "K.", "C.", or "F."; the pressure base may be "gauge" or "absolute"; the vacuum units may be "mmHg" or "in. H$_2$O" or "mil bar"; and the vessel material may be "aluminum" or "steel".

The "Setup" sub-procedure is illustrated in more detail in Screen Display No. 2.

| SCREEN DISPLAY NO. 2 | | |
|---|---|---|
| SM-6 PARAMETER SETUP | | |
| Yard Elevation | 0 Feet | |
| Normalized Temp. | +20.0° C. | |
| Normalized Pres. | 5.00 Kgf-G | |
| Signal 1 Set Point | 4.75 Kgf-G | 4.50 |
| Signal 2 Set Point | 4.00 Kgf-G | |
| Nitrogen Content | 0.00% | |
| Saturation Prox. | +2.0° C. | |

Under the Setup sub-procedure, the operator will normally enter or change the elevation of the location of the apparatus relative to sea level and input the normalized or reference temperature and pressure at which the vessel was loaded to the 100% density reference value. Additionally, the density setpoints are entered to activate the Alarm No. 1 and No. 2 relays 82 and 84. Further, the operator enters data concerning the percentage dilution of the sulphurhexafluoride by nitrogen. The operator may enter the incremental temperature value at which the alarm is activated as the gas approaches its saturation temperature point.

FIG. 7 illustrates a more detailed computer flow diagram to implement the monitoring procedure 104. Step 114 determines if the monitoring device 20 is in the "service mode". If it is, then the trouble relay 80 is activated in step 116 to illuminate indicator 88b. Additionally, the fact that the device 20 is in the service mode is recorded as an event in step 118.

If the device 20 is in the "setup mode" as determined in step 120, then the trouble relay 80 is activated in step 122 and the event is recorded in step 124. If the device 20 is in the "self-test mode" as determined in step 126, then the trouble relay 80 is activated in step 128 and the event is recorded in step 130.

When the device 20 is in the service mode, the control means calculates the present density in step 132 according to the following formula No. 1.

$$\left[\left[\frac{T_2 - T}{T + 273.15 - \left[(P_n \times K) \times \left(\frac{100 - N}{100}\right)\right]}\right] + 1\right] \times$$

$$P' \times (1 - [(T_2 - T) \times V]) = P_2$$

$T'$ is the reference temperature at 100% density.

$P'$ is the reference pressure at 100% density.

$T_2$ is the latest measured temperature sensed by the probe 34.

$P_n$ is a the latest measured pressure sensed by transducer 62 that is normalized to the reference temperature.

N is the percentage of nitrogen by volume in the breaker that is mixed with the sulphurhexafluoride.

V is a constant for the particular vessel wall material. The value for aluminum is 0.0000683 and the value for iron is 0.0000354.

K is a constant of approximately 7.284

A typical screen display is illustrated in Screen Display No. 3 in which the present pressure value is 5.48 Kgf-g and the present temperature is 40.3° C. (a very hot day). The calculated temperature compensated pressure based on a reference value of 5.0 Kgf-g taken at 20° C. The calculated density remains at 100%.

| SCREEN DISPLAY NO. 3 | | | | |
|---|---|---|---|---|
| DENSITY = 100% WHEN | DENSITY | COMP PRES | TEMP | PRES |
| PRES IS: 5.00 Kgf gauge and TEMP IS: +20.0° C. | 100% | 5.00 | +40.3 | 5.48 |

If on the other hand, the calculated density is less than the first setpoint as determined by step 134, then the Alarm No. 1 relay 82 is activated in step 136 and the event is recorded in step 138. If the calculated density continues to deteriorate and falls to a value less than the second setpoint as determined by step 140, then the Alarm No. 2 relay 84 is activated in step 141 and the event is recorded in step 142. Frequently, the control panel 18 upon receiving the Alarm No. 2 signal will lockout further use of the breaker 14 until repair or servicing is accomplished.

FIG. 8 illustrates in more detail the liquefaction program procedure 144. If the vessel temperature is greater than −15° C. as determined in step 146, no action is taken. However, should the temperature of the arc-quenching gas fall below −15° C., then the liquefaction temperature of the gas is calculated in step 148 utilizing Formula No. 2 as follows:

$$((P \times ((100 - N)/100) \times 12.41) - 74.82) - (P \times ((100 - N)/100))^{1.771} = T_s$$

P is the present pressure.

N is the percentage of nitrogen by volume that is mixed with the sulphurhexafluoride.

$T_s$ is the liquefaction temperature of the gas.

After the liquefaction temperature is calculated, it is compared with the actual temperature of the gas in step 150 to determine if the actual temperature of the gas is closely approaching its liquefaction temperature. If it is, then Alarm No. 1 is activated in step 152 with the event being recorded during step 154.

FIG. 9 illustrates the heater control procedure 156, in which a determination is made during step 158 as to whether the internal temperature of the enclosure 22 as sensed by temperature sensor 66 is greater or less than 20° C. If greater, then no action is taken in step 160. If the temperature is less, then the microprocessor in response to the actual temperatures of the gas and the interior of the enclosure 22 instructs the heater control circuit 86 in step 162 to activate the internal heater 56. The amount of heat generated by the heater 56 is intended to maintain the temperature in the enclosure 22 at or above 20° C. to protect the electronics and prevent moisture from forming inside the enclosure 22. Specifically the amount of heat is controlled by varying the duty cycle of the heater during step 164. The correct percentage of the duty cycle is calculated using the following Formula No. 3:

$$[(20-T_2)\times(22-T_1)^3\times 0.1098)] - 1.96 = \%$$

$T_2$ is the temperature of the gas.

$T_I$ is the temperature inside the enclosure.

% is the duty cycle of the heater 56.

FIG. 10 illustrates an interrupt procedure 166 for sensing the variables and updating the calculated information. Periodically, preferably at least once a second, the general program is interrupted in step 168 and the procedure 166 performed. In step 170, the status of the relays 80, 82 and 84 are updated. In step 172, the vessel temperature is read. In step 174, the vessel pressure is read. In step 176, the internal enclosure temperature is read. In step 178, the read information is stored in temporary memory and the LCD alphanumeric display and the individual status indicators 88a–d are updated.

FIG. 11 illustrates a timed periodic interrupt procedure 180 in which the raw data and calculated data are averaged on a periodic basis. In the preferred embodiment, the computer program, through the summary interrupt procedure 180, averages the values stored in temporary memory at least 10 times a day and more preferably 16 times a day. After the procedure is activated in step 181, the vessel temperatures, the vessel pressures, the temperature compensated pressures and the gas density values are all averaged and individually stored in temporary memory during the execution of steps 182–198.

Figure 12:
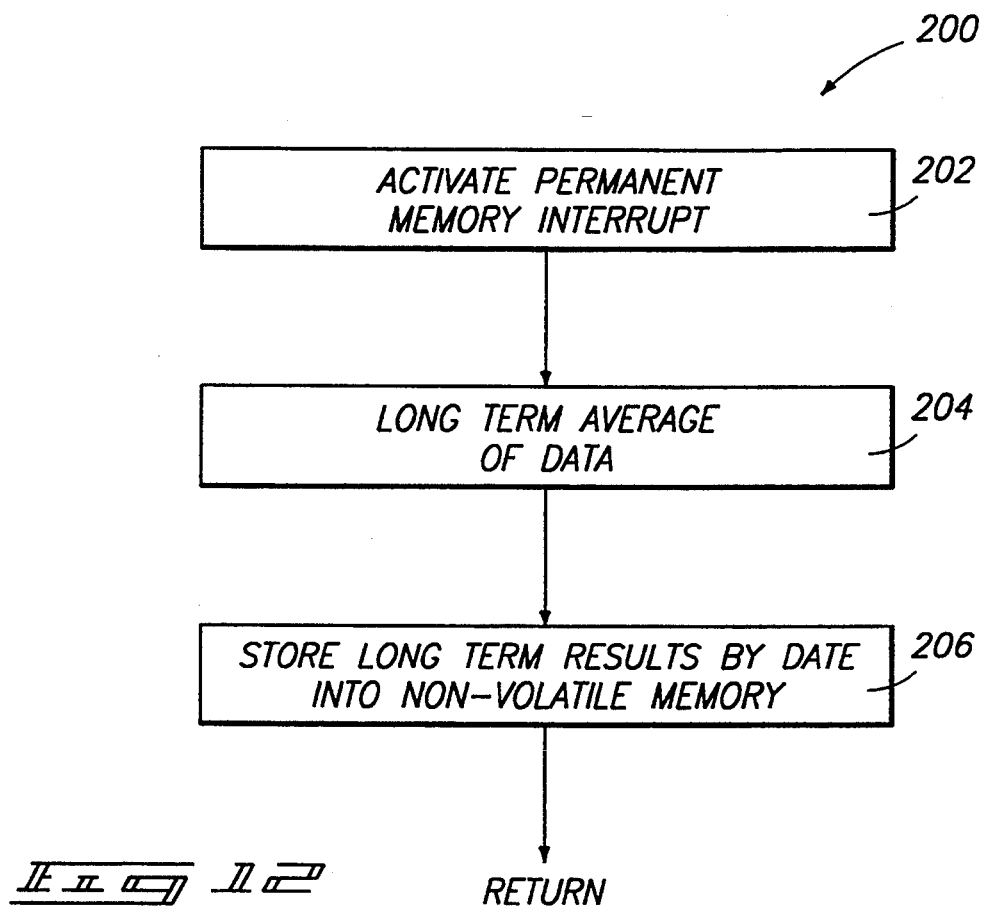
FIG. 12 is a block diagram illustrating the general steps of second data summary interrupt procedure of the computer program.

FIG. 12 illustrates a second timed periodic interrupt procedure 200 that is activated at least once a day to average the stored values for each day for permanent storage. After the interrupt procedure 200 has been initiated, by an interrupt in step 202 the values for the day are averaged in step 204 and then placed in permanent non-volatile storage in step 206. Additionally, the data may be averaged on a monthly or yearly basis. For example, a downloaded screen of the summarized data displayed on a VCR screen is illustrated in the following Screen Displays No. 4A-D:

| SCREEN DISPLAY NO. 4 | | | | | | | |
|---|---|---|---|---|---|---|---|
| A SM-6 DATABASE - TCMP SUMMARY OF YEAR 93 | | B SM-6 DATABASE - DENS SUMMARY OF YEAR 93 | | C SM-6 DATABASE - PRES SUMMARY OF YEAR 93 | | D SM-6 DATABASE - TEMP SUMMARY OF YEAR 93 | |
| JAN 45.0 JUL 43.5 | | JAN 100 JUL 97 | | JAN 40.8 JUL 44.1 | | JAN −5.1 JUL +24.0 | |
| FEB 45.0 AUG 43.2 | | FEB 100 AUG 96 | | FEB 41.3 AUG 43.7 | | FEB −2.2 AUG +23.2 | |
| MAR 44.6 SEP 42.7 | | MAR 99 SEP 95 | | MAR 41.9 SEP 42.3 | | MAR +4.0 SEP +17.2 | |
| APR 44.3 OCT 42.2 | | APR 98 OCT 94 | | APR 42.5 OCT 40.6 | | APR +9.2 OCT +9.8 | |
| MAY 44.0 NOV 41.5 | | MAY 98 NOV 92 | | MAY 43.3 NOV 38.8 | | MAY +15.0 NOV +2.3 | |
| JUN 43.8 DEC 40.1 | | JUN 98 DEC 98 | | JUN 43.7 DEC 36.8 | | JUN +19.3 DEC −2.7 | |

Also during downloading the stored information concerning each recorded event may be obtained as illustrated in Screen Display No. 5 which shows the date, time and abbreviated description of the event for a selected period of time.

| SCREEN DISPLAY NO. 5 | | | | | |
|---|---|---|---|---|---|
| 03/13/93 | 16:11:43 | | | T | -Vt- |
| 03/13/93 | 11:23:34 | | | T | " |
| 03/13/93 | 10:32:45 | L | A | | — |
| 03/13/93 | 08:15:10 | | A | | — |
| 11/23/92 | 18:13:56 | | A | | — |
| 04/29/92 | 15:11:23 | | | T | -Su- |
| 04/29/92 | 14:23:38 | | | T | " |
| 04/29/92 | 14:23:34 | | | T | -St- |

Such information is very useful in being able to reconstruct a history of the breaker 14 with respect to the arc-quenching gas.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A high voltage transmission switching apparatus, comprising:

a switching apparatus housing having a high voltage element in a gas insulated pressurized vessel, in which the high voltage element generates strong electromagnetic radiation;

an arc-quenching gas containing sulphurhexafluoride contained within the interior of the pressurized vessel to insulate the high voltage element;

a gas density monitoring device operative connected to the pressurized vessel for monitoring the density of the sulphurhexafluoride within the pressurized vessel;

said monitoring device having a pressure transducer for determining the static pressure of the arc-quenching gas within the pressurized vessel and for generating an analog signal representative of the determined static pressure;

said monitoring device having a temperature transducer for determining the approximate temperature of the arc-quenching gas within the pressurized vessel and for generating an analog signal representative of the determined temperature;

said monitoring device having an electronic analog-to-digital converter means responsive to the pressure and temperature analog signals for generating corresponding pressure and temperature digital signals;

said monitoring device having a control means for controlling the monitoring device;

said control means comprising (1) an electronic memory means for storing information concerning a preset reference gas density value, and (2) an electronic processing means responsive to the digital signals and the electronic memory means for generating a present digital density signal representative of a present density value of the arc-quenching gas within the pressurized vessel; and said monitoring device having a digital display responsive to the present digital density signal for visually displaying the present density value.

2. The high voltage transmission switching apparatus as defined in claim 1 wherein the present digital density signal is expressed as a percentage of the reference gas density value.

3. The high voltage transmission switching apparatus as defined in claim 1 wherein the monitoring device further includes (1) an enclosure, and (2) a heater for maintaining the temperature within the enclosure above a preset temperature.

4. The high voltage transmission switching apparatus as defined in claim 3 wherein the control means includes a heater control means that is responsive to the temperature of the arc-quenching gas for controlling the heater to maintain the temperature above the preset temperature.

5. The high voltage transmission switching apparatus as defined in claim 4 wherein the heater control means includes an enclosure temperature sensor for sensing the temperature within the enclosure and wherein the heater control means is responsive to the temperature within the enclosure and the temperature of the arc-quenching gas to activate the heater to maintain the temperature above the preset temperature.

6. The high voltage transmission switching apparatus as defined in claim 4 wherein the heater control means has duty cycle circuitry for varying the time period that the heater is activated to maintain the temperature in the enclosure above the preset temperature.

7. The high voltage transmission switching apparatus as defined in claim 1 wherein the gas monitoring device further includes (1) an enclosure, and (2) a heater for maintaining the temperature within the enclosure above the temperature of the arc-quenching gas above a preset temperature.

8. The high voltage transmission switching apparatus as defined in claim 1 wherein the monitoring device has an electromagnetic shield surrounding the control means to minimize electromagnetic interference of the operation of the control means from the strong electromagnetic radiation.

9. The high voltage transmission switching apparatus as defined in claim 1 wherein the electronic processing means periodically generates a present digital density signal representative of the density value of the arc-quenching gas within the vessel at each periodic time and wherein the electronic memory means has mass memory means for storing each present digital density signal.

10. The high voltage transmission switching apparatus as defined in claim 9 wherein the monitoring device has an electronic communication port adapted to transmit the stored digital density signal to a remote data processing device.

11. The high voltage transmission switching apparatus as defined in claim 1 wherein the monitoring device has (1) a pressure and temperature module containing the electronic analog-to-digital converter means, (2) a memory and processing module containing the electronic memory means and the electronic processing means, and (3) a display module containing the digital display.

12. The high voltage transmission switching apparatus as defined in claim 11 wherein each of the modules are spaced from each other and are protected by separate electromagnetic radiation shields.

13. The high voltage transmission switching apparatus as defined in claim 1 wherein the electronic memory means contains a first alarm density value and wherein the monitoring device includes a first alarm relay and wherein the electronic processing means is operatively connected to the first alarm relay and includes alarm circuitry responsive to the first alarm density value and the present density value for activating the first alarm relay when the present density value is equal to or less than the first alarm density value.

14. The high voltage transmission switching apparatus as defined in claim 1 wherein the electronic memory means includes a temporary electronic memory and a mass electronic memory and wherein electronic processing means periodically calculates the present density value and stores each present density value in the temporary electronic memory forming a plurality of stored periodic density values and wherein the electronic processing means periodically averages the stored periodic density values and generates a time-averaged density value and stores such time-averaged density value in the mass electronic memory for subsequent retrieval.

15. The high voltage transmission switching apparatus as defined in claim 14 wherein the electronic processing means generates events information that is stored in the mass electronic memory containing the date on which the event occurred along with information concerning the type of event that occurred.

16. The high voltage transmission switching apparatus as defined in claim 1 wherein the monitoring device includes a vapor-resistent enclosure that is mounted to the apparatus.

17. The high voltage transmission switching apparatus as defined in claim 16 wherein the temperature transducer is mounted to an exterior of the vessel with a conductor extending from the temperature transducer to the monitoring device enclosure.

18. A sulphurhexafluoride gas monitoring device for a high voltage transmission switching apparatus having a pressurized vessel with a high voltage element insulated by an arc-quenching gas, comprising:

a pressure transducer for determining the static pressure of the arc-quenching gas within the pressurized vessel and for generating an analog signal representative of the determined static pressure;

a temperature transducer for determining the approximate temperature of the arc-quenching gas within the pressurized vessel and for generating an analog signal representative of the determined temperature;

an electronic analog-to-digital converter means responsive to the pressure and temperature analog signals for generating corresponding pressure and temperature digital signals;

a control means for controlling the monitoring device;

said control means having (1) an electronic memory means for storing information concerning a preset reference gas density value, and (2) an electronic processing means responsive to the digital signals and the electronic memory means for generating a present digital density signal representative of a present density value of the arc-quenching gas within the pressurized vessel; and a digital display responsive to the present digital density signal for visually displaying the present density value.

19. The sulphurhexafluoride gas monitoring device as defined in claim 18 wherein the present digital density signal is expressed as a percentage of the reference density value.

20. The sulphurhexafluoride gas monitoring device as defined in claim 18 further comprising (1) an enclosure, and (2) a heater for maintaining the temperature within the enclosure above a preset temperature.

21. The sulphurhexafluoride gas monitoring device as defined in claim 20 wherein the control means includes a heater control means that is responsive to the temperature of the arc-quenching gas for controlling the heater to adjust the temperature within the enclosure to maintain the temperature above the preset temperature.

22. The sulphurhexafluoride gas monitoring device as defined in claim 21 wherein the heater control means includes an enclosure temperature sensor for sensing the temperature within the enclosure and wherein the heater control means is responsive to the temperature within the enclosure and the temperature of the arc-quenching gas to activate the heater to maintain the temperature in the enclosure above the preset temperature.

23. The sulphurhexafluoride gas monitoring device as defined in claim 21 wherein the heater control means has duty cycle circuitry for varying the time period that the heater is activated to maintain the temperature in the enclosure above a preset value.

24. The sulphurhexafluoride gas monitoring device as defined in claim 18 further comprising an electromagnetic shield surrounding the control means to minimize electromagnetic interference of the operation of the control means from strong electromagnetic radiation.

25. The sulphurhexafluoride gas monitoring device as defined in claim 18 wherein the electronic processing means periodically generates a present digital density signal representative of the density value of the arc-quenching gas within the vessel at each periodic time and wherein the electronic memory means has mass memory means for storing such present digital density signal.

26. The sulphurhexafluoride gas monitoring device as defined in claim 25 further comprising an electronic communication port adapted to transmit the stored present digital density signal to a remote data processing device.

27. The sulphurhexafluoride gas monitoring device as defined in claim 18 further comprising (1) a pressure and temperature module containing the electronic analog-to-digital converter means, (2) a memory and processing module containing the electronic memory means and the electronic processing means, and (3) a display module containing the digital display.

28. The sulphurhexafluoride gas monitoring device as defined in claim 27 wherein each of the modules are spaced from each other and are protected by separate electromagnetic radiation shields.

29. The sulphurhexafluoride gas monitoring device as defined in claim 18 wherein the electronic memory means contains a first alarm density value and wherein the monitoring device further comprises a first alarm relay and wherein the electronic processing means is operatively connected to the first alarm relay and includes alarm circuitry responsive to the first alarm density value and the present density value for activating the first alarm relay when the present density value is equal to or less than the first alarm density value.

30. The sulphurhexafluoride gas monitoring device as defined in claim 18 wherein the electronic memory means includes a temporary electronic memory and a mass electronic memory and wherein electronic processing means periodically calculates the present density value and stores such present density value in the temporary electronic memory forming a plurality of stored periodic density values and wherein the electronic processing means periodically averages the stored periodic density values and generates a time-averaged density value and stores such time-averaged density value in the mass electronic memory for subsequent retrieval.

31. The sulphurhexafluoride gas monitoring device as defined in claim 30 wherein the electronic processing means generates events information that is stored in the mass electronic memory containing the date on which the event occurred along with information concerning the type of event that occurred.

* * * * *